Oct. 2, 1923. 1,469,371
I. C. ABRAMS
SINK PAN
Filed Aug. 15, 1921
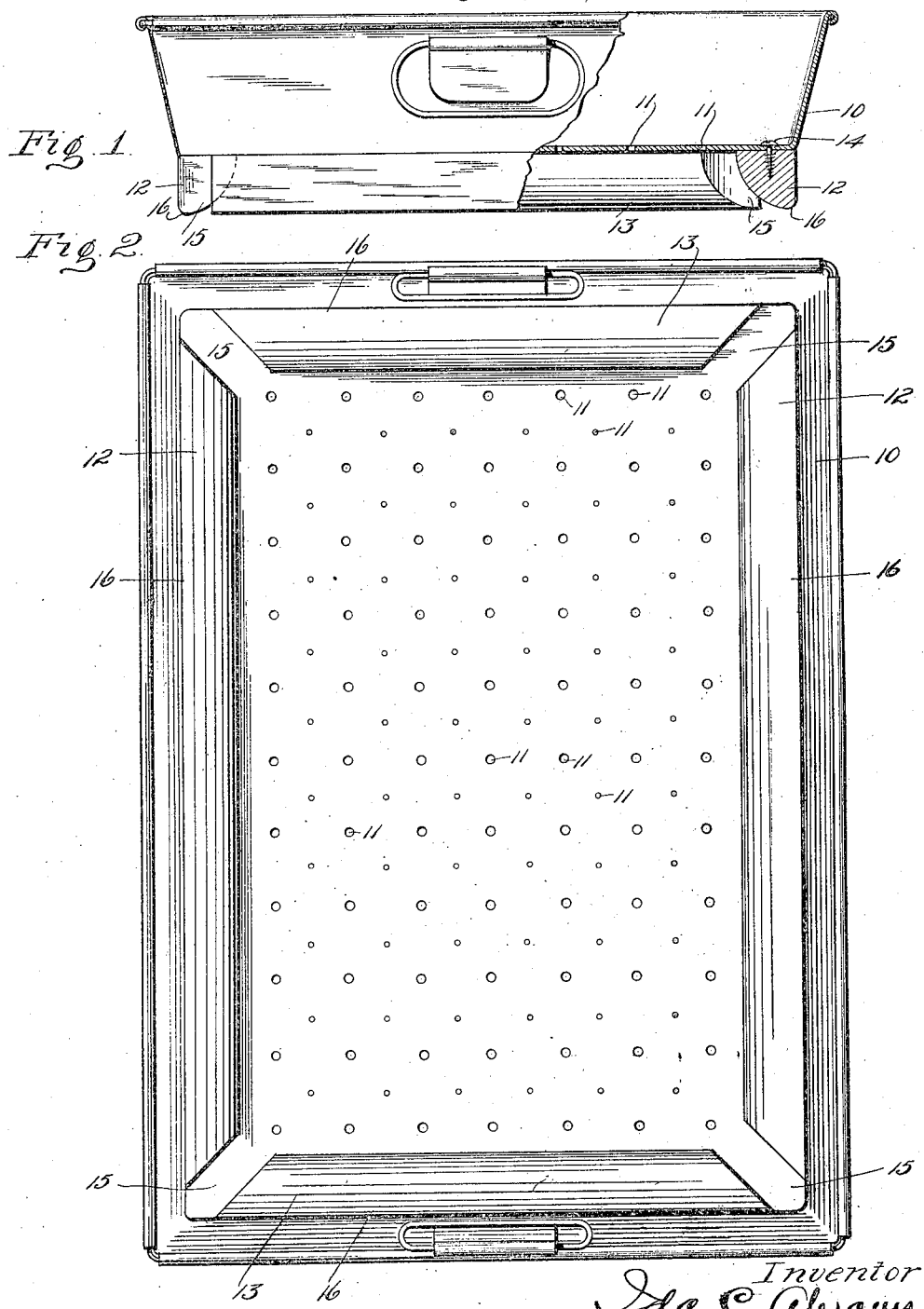

Patented Oct. 2, 1923.

1,469,371

UNITED STATES PATENT OFFICE.

IDA C. ABRAMS, OF NEW HAVEN, CONNECTICUT.

SINK PAN.

Application filed August 15, 1921. Serial No. 492,379.

*To all whom it may concern:*

Be it known that I, IDA C. ABRAMS, a citizen of the United States, residing at New Haven, in the county of New Haven and State of Connecticut, have invented certain new and useful Improvements in Sink Pans, of which the following is a specification, reference being had therein to the accompanying drawings.

This invention relates to a new and improved sink receptacle and it is the principal object of the invention to provide a device of this character which may be properly supported within a sink without injury thereto and which may also be utilized for draining purposes.

Among other aims and objects of the invention may be recited, the provision of a device of this character with a view to compactness, in which the number of parts are few, the construction simple, cost of production small and efficiency and operation high.

The improvements in the details and arrangement of parts will be apparent from an inspection of the accompanying drawings in connection with the description hereinafter contained and wherein a preferred embodiment of the invention is disclosed for the purpose of imparting a full understanding of the same.

In the drawings:—

Figure 1 is a fragmentary end view of my improved sink pan; and,

Figure 2 is a view of the underside thereof.

Having more particular reference to the drawings and in connection with which like characters of reference designate corresponding parts in both views, 10 designates a receptacle having openings or perforations 11 in the bottom thereof and 12—12 and 13—13 are supporting strips so connected by screws 14 or other means to the underside of the pan along the edges thereof as to leave open spaces 15 therebetween.

These strips as shown herein are made with two sides at substantially a right angle to each other and the other side curved, and are preferably made of wood, rubber or like material that is softer than the enamel of the sink or the sink itself, so that the use thereof will injure neither. They also provide a simple and convenient means for imparting rigidity to the pan and as only one corner, designated by the reference numeral 16, is in contact with the sink, the area of contact therewith is minimized.

Any liquids that pass through the perforations 11 are discharged through the open spaces 15, thus the pan may be filled with articles and the running water poured over them escapes through said perforations into the sink and drains through the openings 15.

What I claim as new and desire to secure by Letters Patent, is:

A sink pan, having a bottom perforated except adjacent to the sides thereof, supports for the pan to elevate the bottom, permit drainage thereunder and not injure the surface in contact therewith, comprising a strip of material for each side of the pan that is substantially the same length as the side of the pan with which it is connected, but does not contact with an adjacent strip, said strips having two sides that are at substantially a right angle to each other, one of which is in contact with the underside of the said bottom, and a third side which curves downwardly from the bottom of the pan and outwardly where it joins one of said sides to form a comparatively narrow surface to take the weight of the pan.

In testimony whereof, I have hereunto affixed my signature.

IDA C. ABRAMS.